Patented Apr. 5, 1932

1,852,466

UNITED STATES PATENT OFFICE

ALFRED FRANCIS McCONNELL, OF NEW YORK, N. Y., ASSIGNOR TO THE PERMUTIT COMPANY, OF NEW YORK, N. Y., A CORPORATION OF DELAWARE

PURIFICATION OF VISCOSE

No Drawing.  Application filed July 11, 1930.  Serial No. 467,386.

This invention relates to purifying viscose; and it comprises an improvement in the ordinary viscose method of making filaments, threads and yarn, as well as sheets and films, of regenerated cellulose by reacting upon alkalized cellulose with carbon bisulfid to form a thick solution, purifying this solution and regenerating cellulose by extrusion into a fixing bath, said improvement being in the purifying stage and being a filtration of the thick liquid through a pervious bed of a calcium-containing exchange silicate, advantageously glauconite; all as more fully hereinafter set forth and as claimed.

In the usual method of making rayon threads and yarn, as well as sheets (Cellophane), by the viscose process, cellulose is alkalized with caustic soda solution and brought into solution with the aid of carbon bisulfid, making a thick solution known as "viscose". This viscose solution is purified or clarified in various ways and extruded into or treated with a setting bath, usually dilute sulfuric acid containing sodium sulfate. Artificial silk and transparent sheets made in this way are in large use but are somewhat objectionable by reason of lack of tensile strength and especially when wet.

I have discovered that I can produce an improvement in the quality of rayon silk or sheets made in this usual way, by employing in one of the ordinary filtering steps, designed to remove fiber and turbidity, a pervious bed of an exchange silicate charged with calcium. Glauconite (greensand), I find to be the best exchange silicate or zeolite for this purpose.

In preparing glauconite for this use, it is treated with a solution of calcium chlorid until contained sodium is replaced, as far as possible, by calcium. The glauconite is then well washed and is used as a filter bed through which the viscose solution is passed. Other commercial exchange silicates may be charged with calcium and used in the same way.

In use, it is found expedient to take the filter out of circuit occasionally and renew the calcium content by another treatment by calcium chlorid, followed by washing. In practice, when the calcium content of the filter bed falls substantially, I give the zeolite a calcium chlorid treatment.

As to the reason for the improvement in the finished product, that is, artificial silk, rayon or cellophane, I cannot say, and I content myself with noting the fact without speculating as to the reason.

What I claim is:—

1. As an improvement in methods of making regenerated cellulose from viscose wherein clarification of the viscose solution is resorted to prior to extrusion and setting, the step which comprises filtering the viscose solution, prior to setting of the viscose, through a pervious bed of base exchange silicates charged with calcium.

2. As an improvement in methods of making regenerated cellulose from viscose wherein clarification of the viscose solution is resorted to prior to extrusion and setting, the step which comprises filtering the viscose solution, prior to setting of the viscose, through a pervious bed of glauconite kept charged with calcium.

In testimony whereof, I have hereunto affixed my signature.

ALFRED FRANCIS McCONNELL.